(12) United States Patent
Manning et al.

(10) Patent No.: US 7,281,274 B2
(45) Date of Patent: Oct. 9, 2007

(54) ELECTRONIC MEDIA DISTRIBUTION SYSTEM

(75) Inventors: Damian Franken Manning, New York, NY (US); Jon Walter Lowy, New York, NY (US)

(73) Assignee: LMP Media LLC, New York, NY (US)

( * ) Notice: Subject to any disclaimer, the term of this patent is extended or adjusted under 35 U.S.C. 154(b) by 236 days.

(21) Appl. No.: 10/685,536

(22) Filed: Oct. 16, 2003

(65) Prior Publication Data

US 2005/0086326 A1 Apr. 21, 2005

(51) Int. Cl.
*G06K 9/00* (2006.01)
(52) U.S. Cl. .................. 726/31; 709/219; 709/232; 726/26
(58) Field of Classification Search ............ 726/31; 709/219, 232
See application file for complete search history.

(56) References Cited

U.S. PATENT DOCUMENTS

| | | | |
|---|---|---|---|
| 4,658,093 A | 4/1987 | Hellman | |
| 4,827,508 A | 5/1989 | Shear | |
| 4,977,594 A | 12/1990 | Shear | |
| 5,050,213 A | 9/1991 | Shear | |
| 5,191,573 A | 3/1993 | Hair | |
| 5,293,422 A * | 3/1994 | Loiacono | 726/31 |
| 5,410,598 A | 4/1995 | Shear | |
| 5,530,235 A | 6/1996 | Stefik et al. | |
| 5,557,541 A | 9/1996 | Schulhof et al. | |
| 5,572,442 A | 11/1996 | Schulhof et al. | |
| 5,615,264 A | 3/1997 | Kazmierczak et al. | |
| 5,629,867 A | 5/1997 | Goldman | |
| 5,629,980 A | 5/1997 | Stefik et al. | |
| 5,634,012 A | 5/1997 | Stefik et al. | |
| 5,638,443 A * | 6/1997 | Stefik et al. | 705/54 |
| 5,666,531 A | 9/1997 | Martin | |
| 5,675,734 A | 10/1997 | Hair | |
| 5,684,987 A | 11/1997 | Mamiya et al. | |
| 5,715,403 A | 2/1998 | Stefik | |
| 5,745,879 A | 4/1998 | Wyman | |
| 5,764,762 A | 6/1998 | Kazmierczak et al. | |
| 5,796,829 A | 8/1998 | Newby et al. | |
| 5,809,246 A | 9/1998 | Goldman | |
| 5,818,933 A | 10/1998 | Kambe et al. | |
| 5,841,979 A | 11/1998 | Schulhof et al. | |
| 5,845,281 A | 12/1998 | Benson et al. | |
| 5,852,800 A | 12/1998 | Modeste et al. | |
| 5,892,900 A | 4/1999 | Ginter et al. | |
| 5,910,987 A | 6/1999 | Ginter et al. | |
| 5,914,941 A | 6/1999 | Janky | |
| 5,915,019 A | 6/1999 | Ginter et al. | |
| 5,917,912 A | 6/1999 | Ginter et al. | |
| 5,920,861 A | 7/1999 | Hall et al. | |
| 5,922,208 A | 7/1999 | Demmers | |

(Continued)

*Primary Examiner*—Nasser Moazzami
*Assistant Examiner*—David Garcia Cervetti
(74) *Attorney, Agent, or Firm*—Townsend and Townsend and Crew LLP

(57) ABSTRACT

A system and method for sharing electronic content. A sending user can specify one or more criteria that a recipient memory device must have to store the content. The sending user can also specify a digital rights management control that can be associated with the content. The content can be transferred to the recipient if the recipient memory device has the specified properties. Software at the recipient can ensure that the content is handled in accordance with the digital rights management controls specified by the sender.

65 Claims, 4 Drawing Sheets

U.S. PATENT DOCUMENTS

| | | | | |
|---|---|---|---|---|
| 5,925,127 A | * | 7/1999 | Ahmad | 726/31 |
| 5,933,498 A | | 8/1999 | Schneck et al. | |
| 5,940,504 A | | 8/1999 | Griswold | |
| 5,943,422 A | | 8/1999 | Van Wie et al. | |
| 5,949,876 A | | 9/1999 | Ginter et al. | |
| 5,966,440 A | | 10/1999 | Hair | |
| 5,982,891 A | | 11/1999 | Ginter et al. | |
| 6,014,491 A | | 1/2000 | Hair | |
| 6,049,789 A | * | 4/2000 | Frison et al. | 705/59 |
| 6,067,562 A | | 5/2000 | Goldman | |
| 6,067,640 A | * | 5/2000 | Akiyama et al. | 714/38 |
| 6,094,723 A | * | 7/2000 | Otsuka | 726/31 |
| 6,112,181 A | | 8/2000 | Shear et al. | |
| 6,138,119 A | | 10/2000 | Hall et al. | |
| 6,138,153 A | * | 10/2000 | Collins et al. | 709/221 |
| 6,157,721 A | | 12/2000 | Shear et al. | |
| 6,185,683 B1 | | 2/2001 | Ginter et al. | |
| 6,233,684 B1 | | 5/2001 | Stefik et al. | |
| 6,236,971 B1 | | 5/2001 | Stefik et al. | |
| 6,237,786 B1 | | 5/2001 | Ginter et al. | |
| 6,240,185 B1 | | 5/2001 | Van Wie et al. | |
| 6,253,193 B1 | | 6/2001 | Ginter et al. | |
| 6,282,654 B1 | * | 8/2001 | Ikeda et al. | 726/31 |
| 6,292,569 B1 | | 9/2001 | Shear et al. | |
| 6,295,555 B1 | | 9/2001 | Goldman | |
| 6,314,409 B2 | | 11/2001 | Schneck et al. | |
| 6,363,488 B1 | | 3/2002 | Ginter et al. | |
| 6,389,402 B1 | | 5/2002 | Ginter et al. | |
| 6,427,140 B1 | | 7/2002 | Ginter et al. | |
| 6,449,367 B2 | | 9/2002 | Van Wie et al. | |
| 6,519,700 B1 | | 2/2003 | Ram et al. | |
| 6,549,942 B1 | | 4/2003 | Janky et al. | |
| 6,591,367 B1 | * | 7/2003 | Kobata et al. | 726/31 |
| 6,615,349 B1 | | 9/2003 | Hair | |
| 6,618,484 B1 | | 9/2003 | Van Wie et al. | |
| 6,622,249 B1 | * | 9/2003 | Komuro et al. | 726/31 |
| 6,640,304 B2 | | 10/2003 | Ginter et al. | |
| 6,658,568 B1 | | 12/2003 | Ginter et al. | |
| 6,748,537 B2 | * | 6/2004 | Hughes | 713/193 |
| 6,865,551 B1 | * | 3/2005 | Stefik et al. | 705/51 |
| 6,868,497 B1 | * | 3/2005 | Levy | 726/31 |
| 6,920,436 B2 | * | 7/2005 | Stefik et al. | 705/51 |
| 6,947,910 B2 | * | 9/2005 | Hsu et al. | 705/57 |
| 7,039,613 B2 | * | 5/2006 | Stefik et al. | 705/52 |
| 7,039,848 B2 | * | 5/2006 | Inokuchi et al. | 714/769 |
| 7,076,063 B2 | * | 7/2006 | Kuroiwa | 380/201 |
| 2001/0051928 A1 | * | 12/2001 | Brody | 705/52 |
| 2002/0108050 A1 | | 8/2002 | Raley et al. | |
| 2002/0128972 A1 | | 9/2002 | Stefik et al. | |
| 2002/0161996 A1 | | 10/2002 | Koved et al. | |
| 2002/0184156 A1 | * | 12/2002 | Tadayon et al. | 705/51 |
| 2002/0194485 A1 | | 12/2002 | Ram et al. | |
| 2002/0198845 A1 | | 12/2002 | Lao et al. | |
| 2003/0004885 A1 | * | 1/2003 | Banerjee et al. | 705/52 |
| 2003/0009424 A1 | | 1/2003 | Ta et al. | |
| 2003/0018582 A1 | * | 1/2003 | Yaacovi | 705/51 |
| 2003/0023564 A1 | | 1/2003 | Padhye et al. | |
| 2003/0041123 A1 | * | 2/2003 | Sato et al. | 709/219 |
| 2003/0079133 A1 | | 4/2003 | Breiter et al. | |
| 2003/0110126 A1 | * | 6/2003 | Dunkeld et al. | 705/39 |
| 2003/0120596 A1 | * | 6/2003 | Sharp | 705/40 |
| 2003/0120928 A1 | | 6/2003 | Cato et al. | |
| 2003/0125976 A1 | | 7/2003 | Nguyen et al. | |
| 2003/0135466 A1 | | 7/2003 | Wang et al. | |
| 2003/0140003 A1 | * | 7/2003 | Wang et al. | 705/39 |
| 2003/0140225 A1 | | 7/2003 | Banks et al. | |
| 2003/0144869 A1 | | 7/2003 | Fung et al. | |
| 2003/0149880 A1 | * | 8/2003 | Shamsaasef et al. | 713/182 |
| 2003/0167236 A1 | | 9/2003 | Stefik et al. | |
| 2003/0177400 A1 | | 9/2003 | Raley et al. | |
| 2003/0182142 A1 | | 9/2003 | Valenzuela et al. | |
| 2003/0182235 A1 | | 9/2003 | Wang et al. | |
| 2003/0196091 A1 | | 10/2003 | Raley et al. | |
| 2003/0196092 A1 | | 10/2003 | Raley et al. | |
| 2003/0196093 A1 | | 10/2003 | Raley et al. | |
| 2003/0196109 A1 | | 10/2003 | Raley et al. | |
| 2003/0196119 A1 | | 10/2003 | Raley et al. | |
| 2003/0196120 A1 | | 10/2003 | Raley et al. | |
| 2003/0196121 A1 | | 10/2003 | Raley et al. | |
| 2003/0200468 A1 | | 10/2003 | Raley et al. | |
| 2003/0204753 A1 | | 10/2003 | Raley et al. | |
| 2003/0220880 A1 | | 11/2003 | Lao et al. | |
| 2003/0225698 A1 | | 12/2003 | Stefik et al. | |
| 2003/0225699 A1 | | 12/2003 | Stefik et al. | |
| 2003/0227628 A1 | | 12/2003 | Kreimer et al. | |
| 2003/0233169 A1 | | 12/2003 | Tadayon et al. | |
| 2003/0233330 A1 | | 12/2003 | Raley et al. | |
| 2004/0205028 A1 | * | 10/2004 | Verosub et al. | 705/59 |
| 2005/0021948 A1 | * | 1/2005 | Kamperman | 713/165 |
| 2005/0071669 A1 | * | 3/2005 | Medvinsky et al. | 713/200 |
| 2005/0102515 A1 | * | 5/2005 | Jaworski et al. | 713/168 |

* cited by examiner

US 7,281,274 B2

ELECTRONIC MEDIA DISTRIBUTION SYSTEM

FIELD OF THE INVENTION

The field of the invention is the distribution of electronic information, and in particular in the distribution of electronic information stored on a device.

DETAILED DESCRIPTION

Figure 1:
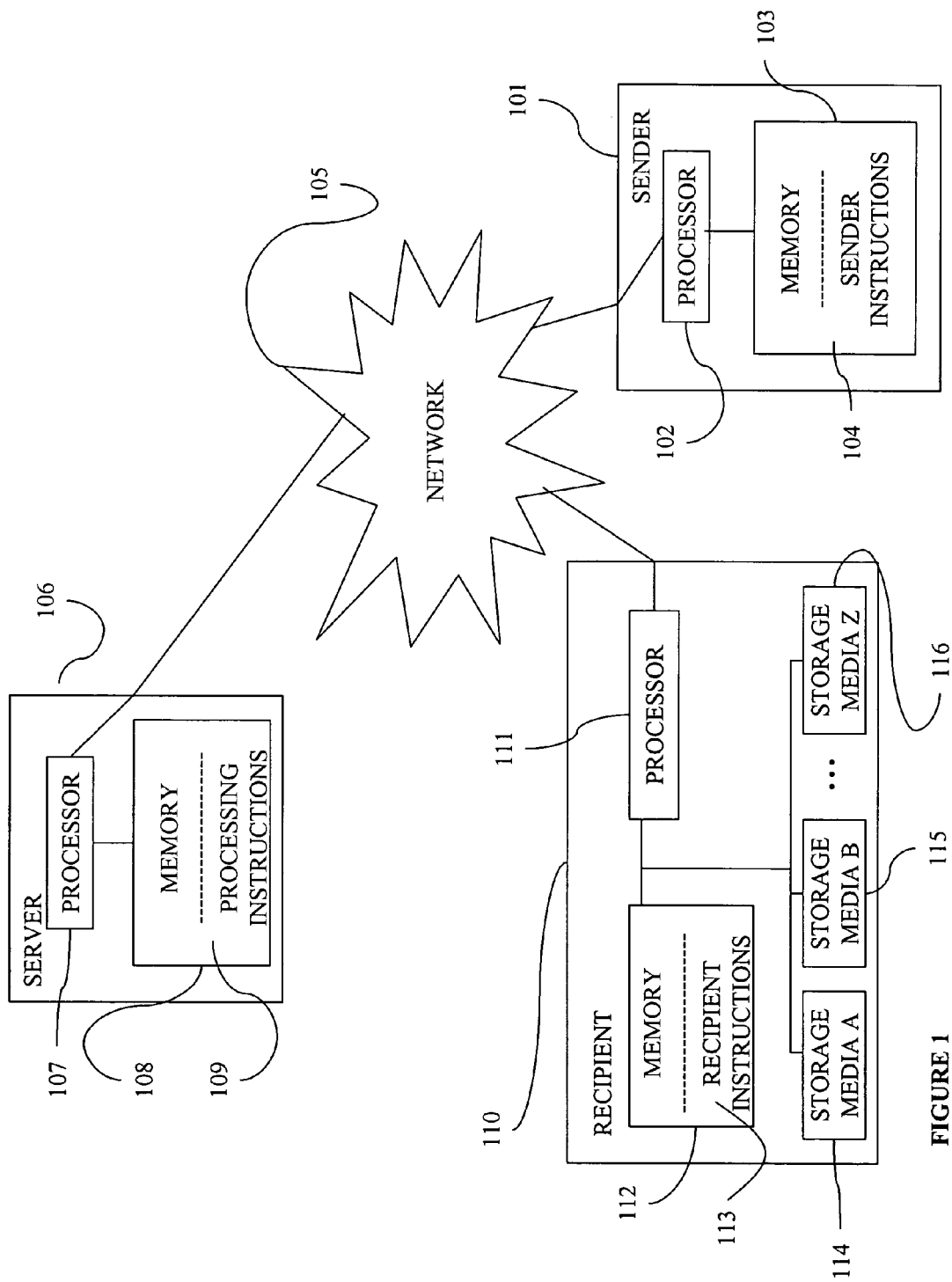
FIG. 1 shows a system in accordance with an embodiment of the present invention.

An system in accordance with an embodiment of the present invention is shown in FIG. 1. Sender 101 can include a processor 102 coupled to memory 103. A processor can be a general purpose microprocessor, such as the Pentium IV processor manufactured by the Intel Corporation of Santa Clara, Calif. A processor can be an Application Specific Integrated Circuit (ASIC) that embodies at least part of the method in accordance with an embodiment of the present invention in hardware and/or firmware. An example of an ASIC is a Digital Signal Processor (DSP). Memory can be any device or combination of devices adapted to store information electronically, such as Random Access Memory (RAM); Read Only Memory (ROM); a hard disk; flash memory; a Compact Disk (CD); etc.

Memory 103 stores sender instructions 104 that are adapted to be executed by processor 102 to perform at least part of the method in accordance with an embodiment of the present invention. For example, sender instructions 104 can provide a sender Graphical User Interface (GUI) to a user at sender 101, through which the user can identify electronic content (e.g., a file of any type, including software, music, audio, video, etc.) to transfer to a recipient, and specify a transfer parameter, e.g., mandate that the transferred file be persistently written only to a CD at the recipient; mandate that the transferred file cannot be further copied from the memory device on which it is to be stored at the recipient; etc. Such transfer parameters can be communicated to a server 106 by "sending instructions" that can be generated by sender instructions 104 and sent from the sender 101 to the server 106. Sender instructions 104 can cause the selected content itself to be sent through network 105 to server 106.

Instructions in accordance with various embodiments of the present invention can be stored on a medium, such as a hard disk, a CD-ROM (compact disc read only memory), a telecommunications channel (e.g., in transit over a network); flash memory; and anything that can store digital information.

Server 106 can include a processor 107 coupled to memory 108, which stores processing instructions 109. Processing instructions 109 can be executed by processor 107 to perform at least part of the method in accordance with an embodiment of the present invention. For example, processing instructions 109 can send a message to recipient 110 through network 105, where the message announces to a user at recipient 110 that content sent from sender 101 can be downloaded by recipient 110, e.g., by selecting a link included in the message.

Recipient 110 can include a processor 111 coupled to memory 112 that stores recipient instructions 113 that are adapted to be executed by processor 111 to perform at least a part of the method in accordance with an embodiment of the present invention. For example, recipient instructions 113 can receive from server 106 a message indicating that certain content from sender 101 is ready to be delivered to recipient 110. Recipient instructions 113 can provide a recipient GUI to a user at recipient 110 through which the recipient user can send a message to serve 106 to send the content to recipient 110. Recipient can also include various ancillary memory devices, such as storage media A 114, storage media B 115, and other storage media, e.g., including storage media Z 116. In one embodiment, storage media A is a flash memory device; storage media B is a CD (compact disc); storage media Z is a DVD (digital video disc); etc.

Processing instructions 109 can receive a request from recipient 110 for the content and apply a content policy (not shown) in sending the content to the recipient. The content policy can be one or more rules pertaining to the content, e.g., to the distribution, storage, use, etc., of the content. The content policy can include instructions stored in memory 108 that are adapted to be executed by a processor (such as processor 107), and can also include data, such as rule parameters. For example, server 106 can receive instructions from sender 101 indicating that certain content from sender 101 may only be installed (persistently stored) on a CD at recipient 110.

Consistent with the content policy, processing instructions 109 can be executed by processor 107 to determine if recipient has the appropriate recipient instructions 113 (e.g., has recipient instructions 113 at all, has a current version of recipient instructions 113, etc.). In this example, recipient instructions 113 include software for writing data to a CD ("CD burning instructions"). If server 106 determines that recipient does not have the appropriate recipient instructions 113 installed, then server 106 can send (or arrange to have sent) the appropriate recipient instructions 113, which, in this embodiment, include CD burning instructions. When these have been successfully installed at recipient 110, server 106 can exchange messages with recipient 106 such that the content is sent from server 106 to recipient 110 and persistently installed only on a CD, i.e., on storage media B 115. Server can ensure that no other persistent copy of the content is stored elsewhere by sending the appropriate data and/or instructions to recipient processor 111, which is executing recipient instructions 113. For example, if no CD is present at recipient 110, or if no CD burning instructions are installed at recipient 110, then server 106 can refuse to send the content to recipient 110. In this way, sender 106 can advantageously control the medium onto which content sent from sender 101 to recipient 110 (through server 106) is persistently stored.

Server 106 can also provide Digital Rights Management (DRM) services by handling content from sender 101 consistently with a content policy. DRM includes technical measures for controlling the distribution, redistribution, storage and/or use of content. For example, server 106 can obtain content from sender 101 over a Secure Sockets Layer (SSL) connection, i.e., the content can be encrypted using a set of symmetric keys shared for a session between sender 101 and server 106. Sender instructions 104 can provide a user friendly GUI to a user at sender 101 through which the sender-user can specify one or more DRM parameters that control the content. For example, as discussed above, the sender-user can specify through the GUI that the content be delivered to recipient and persistently stored only on a CD. Server 106 can enforce this sender-set policy by ensuring that the appropriate CD burning instructions are installed at recipient 110 and an appropriate (e.g., blank) CD is present at recipient 110 before sending the content to recipient 110. Server 106 can then interact with recipient 110 to ensure that the content is properly installed (persistently stored) on the CD, and nowhere else. For example, server 106 can utilize controls such as those proposed for computer systems by the Trusted Computing Platform Alliance (TCPA) and the Palladium system developed by the Microsoft Corporation of Redmond, Wash. The TCPA and Palladium controls help to provide assurance that a computing platform operates in a trusted fashion, i.e., that is protects the confidentiality and integrity of content in accordance with policies set forth by the rights holders in and to the content. These policies can be implemented in software and/or hardware. The measures set forth in accordance with TCPA and Palladium requirements and/or specifications help to ensure that the software and/or hardware of a computing platform implements the policies correctly, completely and exactly. The software used in an embodiment of the present invention to implement the policies can include recipient instructions 113; processing instructions 109; and sender instructions 104.

Figure 2:
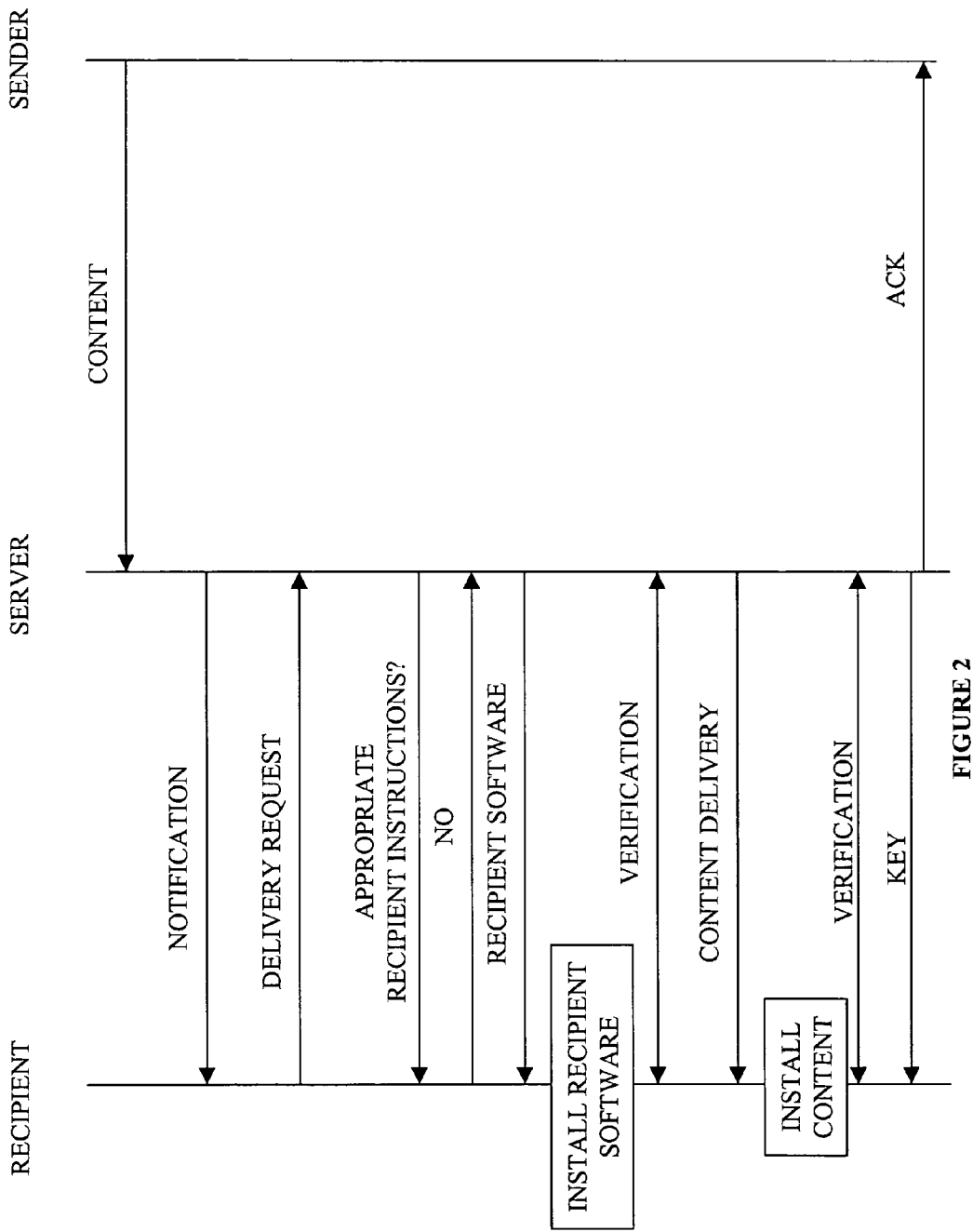
FIG. 2 shows a message flow diagram in accordance with an embodiment of the present invention.

FIG. 2 shows a message flow diagram in accordance with an embodiment of the present invention. Sender transmits content to the server, which sends a notification to the recipient. The notification can include a link that can initiate the content delivery process from the server when a user at the recipient selects the link. The link can be selected as soon as the message is received at the recipient, or hours, days or even weeks later. The recipient sends a message to the server to deliver the content. At that time, the server determines if the recipient has the appropriate recipient software (instructions) installed at the recipient, e.g., CD burning software. In this example, the recipient sends a message to the server indicating that the recipient does not have such software installed. In response, the server automatically provides the recipient software to the recipient, and the software is installed at the recipient. The correct installation of the software can be verified with an exchange of messages between the server and recipient. For example, when the software is installed correctly, it can include instructions to send to the server a code known to the server but not the recipient. If the received code is determined to indicate a correct installation of the software at the recipient, then the server sends the content to the recipient. The content can be encrypted using a cryptographic key, at least part of which is known by the server and not the recipient.

The recipient installs the content, i.e., in this example, stores it on a CD. The recipient software can verify that the content is properly stored on a CD and, e.g., that no residual copy remains on another recipient memory device, such as the hard disk. This can be done, for example, by including instructions in the recipient software that can find and erases any residual copies of the content from other memory devices at the recipient. The proper storage of the content at the recipient can be verified by an exchange of messages between the server and recipient, e.g., by causing the recipient to send to the server a code known to the server but not the recipient to indicate that the content is stored properly on the CD, and not on another memory device at the recipient. Upon successfully verifying that the content has been properly stored at the recipient, the server can send a cryptographic key to the recipient that the recipient software can use to access (decrypt) the stored content.

In accordance with other embodiments of the present invention, the sender can cause the server to apply more complex DRM controls to content sent from the sender to the server for delivery to a recipient. For example, the sender-user can specify through a GUI to limit the number of times that the content can be rendered (e.g., played, viewed, etc.) by the recipient. The content can be sent along with a DRM parameter (e.g., the maximum number of renderings for the recipient shall be 50) to the server. The server can encrypt the content using a cryptographic key, and send the content along with authenticated DRM instructions (e.g., instructions digitally signed by the server) to the recipient, after the server has verified that the recipient has the appropriate trusted platform (hardware and/or software) necessary to enforce DRM instructions (also, "DRM controls") with respect to the content. The instructions can specify that the maximum number of renderings is equal to 50. The instructions can be sent attached to the content (e.g., appended as a header); encoded into the content as a watermark; or sent separately from the content to the recipient. At the recipient, the trusted recipient platform enforces the DRM controls by limiting the number of renderings to no more that 50.

Also, the server can help to administer the DRM controls set by the sender. For example, the DRM controls set by the sender-user can specify that a sender-user account be credited each time a content is rendered at the recipient. The server can send a control to the recipient when the recipient requests delivery of the content to cause the recipient to send a message to the server (a "usage message") each time the content is rendered at the recipient. The server can then debit a recipient-user account and credit the sender-user account each time the content is rendered at the recipient. The server can collect a service fee from the recipient-user, from the sender-user, or from both for administering the payment from the recipient-user to the sender-user.

The server can apply and/or administer redistribution controls for content delivered through the server from sender to recipient. For example, the sender-user can indicate through a sender GUI that the recipient can only redistribute the content through the server, and specify to the server other recipients (or types of recipients) to whom the content may be redistributed at the direction of a recipient to which the content has been delivered. For example, the sender can specify that the server can only redistribute the content sent to a given recipient at the request of the recipient and only to other recipients having network addresses that correspond to a given second level domain name, e.g., to users at aol.com. For example, a recipient of the content can send a request to the server to redistribute it to a user that has a content receiving and storing service that is hosted at aol.com, but not to a user having a content receiving and storing service that is hosted at, say, earthlink.net.

In accordance with an embodiment of the present invention, a first user, User A, can send content to a second user, User B, and mandate that the content be stored on a CD at User B. User A and User B can be connected to the Internet via broadband connections, and User B can have a CD-RW (compact disc rewritable) drive in his computer. The users' computers can both be behind router/firewalls which perform network address translation (NAT) and block incoming traffic. Assume that neither user has yet used the present invention.

User A utilizes his browser to visit a web site that implements an embodiment of the present invention, e.g., <http://echospin.com>. There he clicks on a link labeled "send a CD". Clicking on this link initiates an auto-install process, e.g., using a signed ActiveX control that is installed into the browser, and launches the installation process. Sender instructions (also, "sender software") can thereby be installed on the sender (User A) computer.

When installation is complete, User A is invited to register and create an account, e.g., requiring User A to supplying a username, e-mail address, credit card number, password, etc. The user can also enter other profile data, such as his own and prospective recipients' Instant Message (IM) addresses, alerting preferences, etc.

After registration, the sender software can scan User A's system for drives that support compact disks. If they are found and are empty, the sender software can prompt the user to place the CD he wants to send in one of the drives. If the sender software finds any music CDs in any of the drives, it can attempt to connect to a third party CD directory, e.g., via the Internet, to retrieve the CD's metadata. The CD's metadata can advantageously be presented to User A along with a request to verify that the identified CD is the one he wishes to share with a recipient. For example, rather than ask User A if he wants to send the "music disc in Drive D", the sender software can ask him if he wants to send "Bach's Unaccompanied Cello Suites", which corresponds to a CD in a first drive of User A;

Led Zeppelin: Star Profile, which corresponds to a CD is a second drive of User A; or Tom Clancy: Red Rabbit, disk 1. User A can select the CD he wants to send, and can change the name of the CD if he wants.

The sender software can prompt User A to enter either the destination address (e.g., e-mail address, IM address, or registered identifier of the person to whom he wants to send the content. The user can include a text message to be sent along with notification, and can aggregate content from different sources to be sent in a single transmission to a recipient. In this example, User A wishes to send the CD to User B, and enters User B's e-mail address and IM address. He indicates that the server should notify User B via both email and IM, adds a short text message to be included in the notification, and clicks "send". User A can also add a short voice file with a spoken message; an image (such as a JPG image); a digital certificate; or any other data User A wishes.

After clicking send, the client software can begin the sending process. The sender software can display the progress of the transmission of the selected content from the sender (User A's) computer to the server. The sender GUI can be minimized/hidden to work in the background. In sending the content in this example to the server, the sender software can extract the music/voice content and data (the disk table of contents, or TOC) from the CD. Of course, the content need not be limited to music or voice, but can be any kind of content. Here, the music/voice content can be ripped from the CD drive and transcoded on the fly to a file using an audio compression algorithm. The resulting music/voice content and TOC are uploaded to the server along with User B's addresses and the text message. This (collectively, the "package") can be stored at the server. User A can suspend this process at any time and resume it later, or else abandon it.

Once the package has been received at the server, the sender software can present a message to User A indicating that the package has been successfully sent. The server can examine and verify the data that User A has sent. The server can search its user database to see if User B already has an account. If not, then the server can advantageously create a new account in anticipation of User B. As requested by User A, two notifications, one via e-mail and the other via IM, can be sent from the server to User B. Each notification can inform User B that User A has sent him a CD entitled "Bach's Unaccompanied Cello Suites," and can include User A's text note. The message can also contain a hyperlink that points to the server and includes a token, e.g., <http://www.echospin.com/-unique-token>; <echospin.com/application?token=unique-token>; <http://unique-token.echospin.com>; etc. The token can be unique to the notification message (e.g., different for the e-mail and IM messages) and be stored in the server's database. This unique token can be linked to User B's account; and/or to all or part of the package. The notification can inform User B that in order to receive the package, User B must click on the hyperlink.

If User B clicks on the link in either notification, his web browser can be pointed (send an HTTP request) to the server. The server can return a web page to the browser which contains code to detect whether or not the recipient instructions (also, "recipient software) is installed. This can be done with a client-side script or a binary. The web page can also have a link which will launch the recipient software if it is already installed, that is, the recipient software can intercept the request.

The web page can also download a recipient software auto-installer if needed. The auto-installer can install the recipient software, which can then be launched. The recipient software can prompt User B to enter the required data to complete his account registration. The recipient software can then scan User B's system for a CD-R/RW (compact disc recordable/rewritable) device. If it finds more than one such a device, it can prompt the User B to specify at which one he wants the package to be stored. User B can decide to receive the package immediately or he can defer this for another time. If he elects to pick up the package, the client software can contact the server and download the package. As with the upload, status can be displayed on the progress of each step, and the recipient software GUI can advantageously be minimized/hidden to work in the background. When the package is downloaded, the recipient software can decode the content. The recipient software can check for a suitable blank disc in the recipient's CD-R/RW drive, and instructs User B to insert one if needed. The content can then be stored on the CD. Once the CD-R/RW has been written, the client determines if the write was successful. If so, it can inform User B and report to the server that the package has been delivered. The server can then send a message to User A to inform him that the package has been received by User B.

In one embodiment, sender software can disable the sender's CD based upon a DRM rule. For example, the rule may state that when the content of a CD is sent from a sender to a receiver, then sender CD must be disabled. In this case, the sender CD can be overwritten while or after the content on the CD is sent to the server for delivery to the recipient. Alternatively, the content on the sender CD can be encrypted, and the key can be deleted from the sender computer after the content on the CD is sent to the recipient. Similarly, a rule may state that after three copies of the content are sent to one or more recipients, the sending CD must be disabled. This can be implemented similarly. An index representing the number of times the content has been sent can be stored on the CD from which the content is sent; on the sender computer; or on the server.

Figure 3:
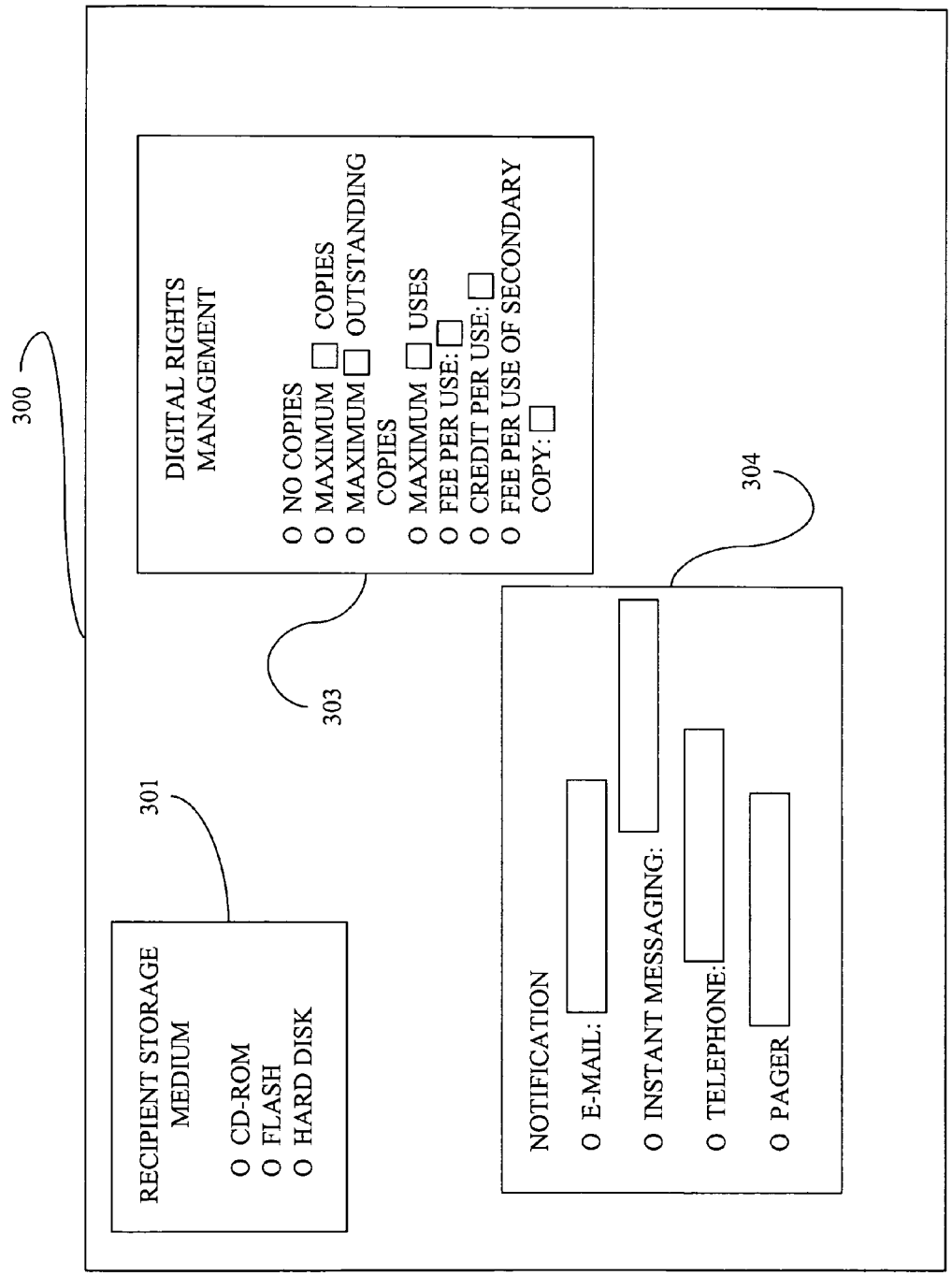
FIG. 3 shows a graphical user interface in accordance with an embodiment of the present invention.

FIG. 3 shows a graphical user interface (GUI) 300 that can be presented to a user at sender computer 101 in accordance with sender instructions 104 executing on sender processor 102. The GUI provides an opportunity for the user to select a particular memory device 301 on which content (e.g., a file) to be transferred from the sender 101 to the recipient 110 may be stored. In this example, the sending user can specify that the content be permitted to be stored on a CD-ROM at the recipient 110; a flash memory card at the recipient 110; and/or a hard disk at the recipient 110. This selection by the sending user can be mandatory, and can be enforced by recipient instructions 113. For example, recipient processor 111 can include tamper resistant features, such as those proposed by the Trusted Computing Group (see <www.trustedcomputinggroup.com>) and set forth in the Trusted Computing Group, Main Specification, Version 1.1a. See <https://www.trustedcomputinggroup.org/downloads/tcg spec.sub.--1.sub.--1b-.zip>. Recipient 110 can also store and execute trusted software such as that proposed and developed by the Microsoft Corporation of Redmond, Wash. pursuant to the Palladium Next-Generation Secure Computing Base for Windows. See <http://www.microsoft.com/presspass/features/2002/jul02/0724palladiumwp.asp>. Recipient instructions can execute in conjunction with trusted hardware and software at the recipient 110 to reliably implement transfer parameters specified by the sending user through the sender GUI 300. Thus, for example, if the sending user specifies that the content to be transferred from the sender 101 to the recipient 110 through server 106 can only be stored on a CD-ROM or flash memory at the recipient 110, then the recipient instructions 113 can be trusted not to store the transferred content to, for example, a hard disk at the recipient 110.

Likewise, recipient instructions 113 can also be trusted to implement digital rights management controls established by the sending user through GUI 300. A digital rights management control is information that can specify how, when and/or where content with which the control is associated may be used, distributed, stored, etc. Such a control can also specify how much and who can be charged for a use, distribution and/or the storage of associated content. Such a control can also specify an action to be taken when the associated content is used, distributed and/or stored. For example, the sending user can specify that the transferred content must be stored on a hard disk at the recipient 110 and that no further copy may be made of the copy of the transferred content that is stored on the hard disk. Recipient instructions 113 can be structured to implement this control by, for example, storing a statement of the "no copy" policy in a tamper resistant fashion using trusted hardware and software such as that discussed above. The recipient instructions 113 can intercept a request to copy the transferred content from the hard disk, consult the policy, and deny permission to make the copy. In another embodiment, the recipient instructions can prevent the creation of a usable copy, e.g., one stored on a portable medium at the recipient 110 (such as a CD-ROM) by causing the content to be stored in an encrypted fashion on a CD-ROM that has a unique tamper resistant identifier and to securely store at least part of the cryptographic key that is required to render (e.g., play, display, use, etc.) the content and a statement of the "no copy" policy in a tamper resistant fashion at the recipient 110. When a recipient user seeks to use a copy of transferred content, the recipient instructions 113 can consult the policy, determine if the copy sought to be used is stored on a CD-ROM, and if so, if the CD-ROM has the same identity as the authorized CD-ROM. If so, then the key material can be used to render the content. Otherwise, recipient instructions 113 can refuse to make available the key material required to use the content. A tamper resistant identity for a CD-ROM can be established by using a fixed, tamper resistant serial number that is written to the CD-ROM.

The sending user may also specify a digital rights management control 303 that mandates that no more than a given number of copies may be made of the file from the second memory device. In this embodiment, the recipient instructions 113 can mandate that a copy may only be made if permission is provided by instructions 113 executing on processor 111, and maintain a counter that is incremented each time a copy is authorized. When the counter reaches the given number, no further authorizations to copy are granted.

In another embodiment, the sending user mandates that no copy may be made of the file from the second memory device if the number of outstanding copies already made of the file from the second memory device is equal to a given number. For example, the recipient instructions can maintain a counter that is incremented whenever another copy is made, and decremented upon confirming that an existing copy has been deleted or otherwise disabled (e.g., a cryptographic key needed to use a copy has been deleted). Recipient instructions 113 can withhold permission to make another copy when the counter reaches the given number until one or more existing copies are deleted or disabled.

A counter can also be maintained by the recipient instructions 113 for tracking the number of times a copy is used. When the counter reaches a given number, recipient instructions 113 can deny a request to use the content further. The recipient instructions can also store a fee amount to be charged to the recipient based upon the use of the copy stored at the second memory device. In this embodiment, the recipient instructions debit a recipient account to the sum of the fee amount each time the content is used, when the content has been used a given number of times, the first N times the content is used (where N is an integer), etc.

The recipient instructions can also pay to the user a credit mount based upon the use of the copy stored at the second memory device. For example, the content can include an advertisement. A user account can be credited (e.g., with money, with frequent flier points, with a discount amount for a good or service, etc.) each time the content is used, after the content has been used a number of times, the first M times the content is used (where M is an integer), etc.

The sending user can also elect to have a fee charged based upon the usage of a "secondary copy", i.e., a copy made of the copy stored at the recipient 110. The fee can be per use of the secondary copy; a fee for the first K uses of the secondary copy (where K is an integer); a fee after the content has been used L times (where L is an integer); etc.

In one embodiment, the digital rights management controls can be packaged with the content at the sender 101, e.g., added to the content as header information. In another embodiment, the digital rights management controls can be associated with the content by the server, e.g., added to the content as header information at the server 106. Alternatively, such controls can be formulated and sent separately, either from the sender 101, the server 106, or both. A separate control can be associated with a given piece of content by associating the same identifier with the control as the content. The identifier can occur in header information, be embedded as a watermark, etc. Digital rights management control information can be sent as part of the sending instructions, which can also include instructions as to the memory device on which the content is permitted to be stored at the recipient 110.

FIG. 3 shows examples of selections on GUI 300 that can be made by the sending user to impose digital rights management controls on the content to be transferred. As discussed above and as shown, the sending user can require that the recipient user be able to make no copies from the recipient's copy of the transferred content; specify a maximum permissible number of such copies; a maximum number of outstanding copies; a maximum number of times a copy may be used; a fee amount based upon use of the copy or copies; and a credit amount based upon the use of the copy or copies. Any or all of these parameters, as well as any other suitable parameter, can also be set by server 106. For example, server 106 can implement a policy that requires a maximum permissible number of copies for content that includes a given company (e.g., ACME Music Company) among its rights holders. The policies of the server 106 can be made to preempt designations made by the sending user. Thus, if the sending user specifies that a given piece of content to be transferred from the sender 101 to the recipient through server 106 is six, and if a preempting policy at the server 106 mandates at most 4copies, then processing instructions 109 at the server 106 can overwrite the transfer parameter set by the sending user (six) with its own parameter (four). As above, such a transfer parameter can be used by recipient instructions 113 to enforce a digital rights management rule for the transferred content at the recipient 110. Likewise, server 106 policies can be preempted by sending user policies.

FIG. 3 also shows how a sending user can choose to have the recipient user notified 304 that content sent from the sender 101 can be obtained from server 106. The user can elect to have the user notified, for example, by one or more of e-mail; instant messaging service; telephone; pager; etc., that content can be downloaded either from server 106 or directly from sender 101. The sending user can specify the appropriate address for each such notification, e.g., e-mail address; instant messaging address; telephone number; pager number; etc.

Figure 4:
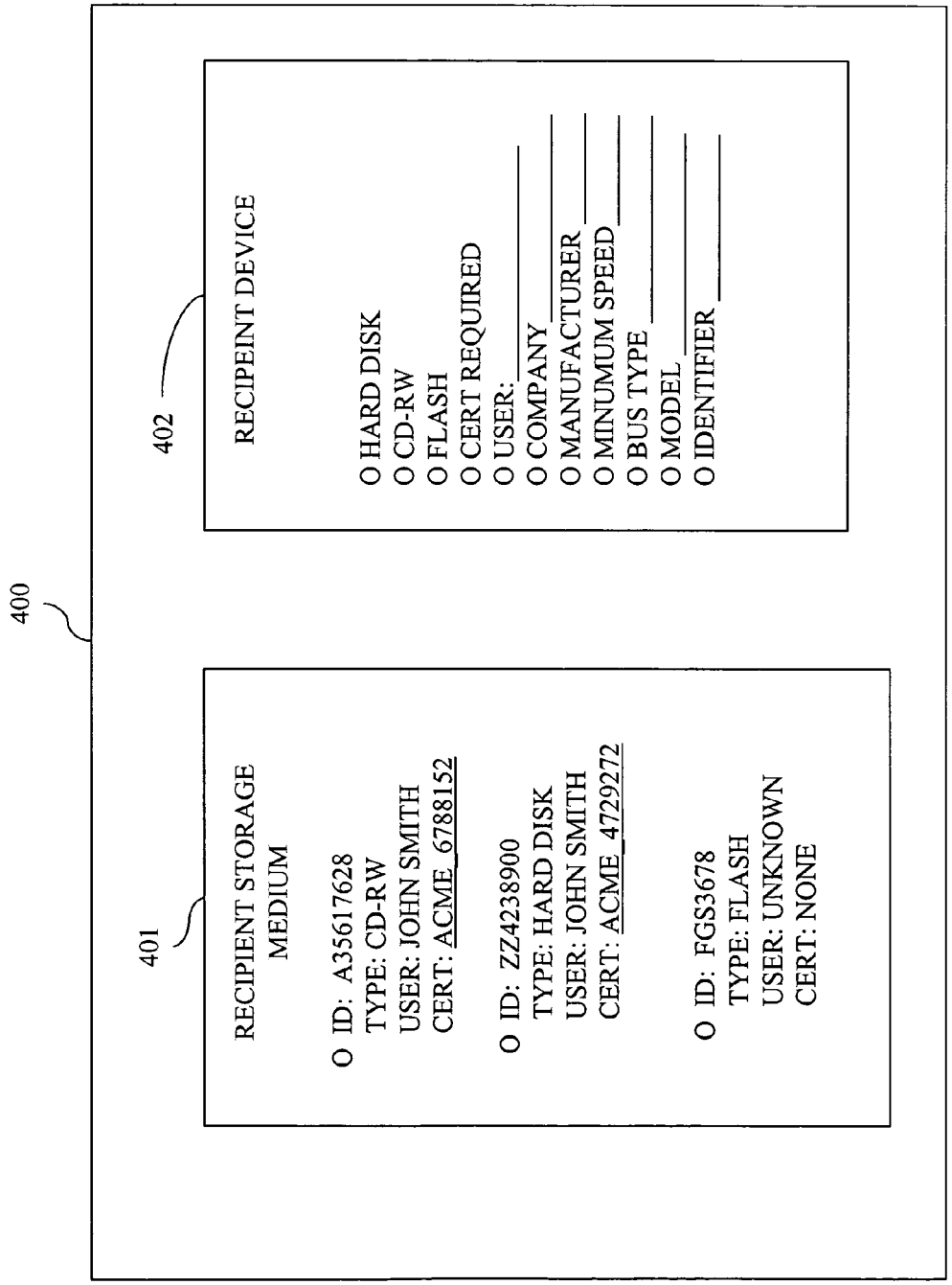
FIG. 4 shows an interface in accordance with an embodiment of the present invention.

FIG. 4 shows a graphical user interface 400 that demonstrates that the sending user can discover attributes of recipient 110 and further specify the medium and digital rights management controls for the content transferred to the recipient 110, in accordance with an embodiment of the present invention. For example, sender instructions 104 can interact with recipient instructions 113 (and/or can use processing instructions 109 at server 106), either directly in a peer-to-peer mode, or indirectly through an intermediate server, to identify a specific memory device at the recipient on which content from the sender 101 is permitted to be stored. For example, as shown in FIG. 4, sender 101 has discovered three specific storage devices 401 at the recipient, and the sending user can select one or more such devices as permissible storage devices for content transferred from the sender. If the sending user select more than one permissible device, then the recipient instructions 113 can present the option to the recipient user to select one or more (or only one) of the permissible devices upon which the content will be stored. A storage device can be authenticated to the discovering software, e.g., the sender instructions 103. In this way, the sending user is assured that he is sending content to an authorized device.

A recipient memory device can be discovered and specified to the sending user in any suitable way. For example, as shown in FIG. 4, the recipient memory device can be specified by a device identifier; type (e.g., hard disk, flash memory, writeable CD-ROM, etc.); user name (e.g., the recipient user; the owner of the memory device; etc.); organization identifier (e.g., manufacturer's name; company-owner name; etc.); model identifier; capability (e.g., DRM-enabled, capacity (e.g., in megabytes); speed (the rates at which data may be transferred to and/or from the device); bus compatibility (e.g., USB (universal serial bus), PCI (peripheral component interconnect), SCSI (small computer system interface), etc.); or any other criterion or criteria that can be useful in designating a recipient memory device for receiving content from the sender. A recipient memory device criterion can be any property of a recipient memory device that can be required to store on that device one or more pieces of electronic content from a sender. If the sending user specifies that only a memory device having the identifier 14534 may store a given item of electronic content from the sender, then the recipient memory device must have that criterion (identifier 14534) to store the sent content. If no such memory device having the specified criterion or criteria exists at a recipient, then the sender can refuse to send the content to the recipient.

The recipient memory device can store a digital certificate and be authenticated by the sender. For example, successfully verifying the certificate can be a prerequisite to sending the content to a recipient memory device.

The sending user can specify one or more attributes that a recipient memory device must have to receive content from the sender, e.g., by selecting one or more of the options listed (and filling in the appropriate information where indicated) as shown in 402 of FIG. 4. If more than one qualifying recipient memory device is found, then the different devices can be displayed to the sending user. The sending user can then select one or more of these devices to which content can be sent and stored.

The content can be sent in accordance with the one or more criteria selected by the sending user, either with or without a digital rights management control.

An embodiment of the present invention can permit a sending user to specify that content be sent to a recipient only if the memory device on which the content is to be stored at the recipient meets certain requirements. This can apply to one or more memory devices at the recipient. The sender can also associate one or more digital rights management controls with the content, which software at the recipient can enforce. One of ordinary skill in the art will recognize that the foregoing examples illustrate embodiments of the present invention, and are not meant to limit the scope of the claims, which can encompass other embodiments not explicitly described above.

What is claimed is:

1. A method for sharing information, including:

receiving sending instructions to transfer to a recipient a file, said sending instructions identifying a specific type of memory device on which the file is permitted to be stored at the recipient;

receiving the file;

sending a notice to the recipient indicating that the recipient may download the file;

receiving a request for the file from the recipient;

determining if transfer software to transfer the file only to the specific type of memory device is installed at the recipient;

if transfer software is not installed at the recipient, then sending the transfer software to the recipient; and sending the file to the recipient to be stored on the specific type of memory device only if the transfer software to install only to the specific type of memory device is installed.

2. The method of claim 1, wherein the sending instructions identify the specific type of memory device to be a CD-ROM.

3. The method of claim 1, wherein the sending instructions identify the specific type of memory device to be flash memory.

4. The method of claim 1, wherein the sending instructions further identify a digital rights management control to be applied to the file.

5. The method of claim 4, wherein the digital rights management control indicates that no copy may be made of the file from the specific type of memory device.

6. The method of claim 4, wherein the digital rights management control indicates that no more than a given number of copies may be made of the file from the specific type of memory device.

7. The method of claim 4, wherein the digital rights management control indicates that no copy may be made of the file from the specific type of memory device if the number of outstanding copies already made of the file from the specific type of memory device is equal to a given number.

8. The method of claim 4, wherein the digital rights management control indicates a maximum number of times the copy can be used is equal to a given number.

9. The method of claim 4, wherein the digital rights management control indicates a fee amount to be charged to the recipient based upon the use of the copy stored at the specific type of memory device.

10. The method of claim 4, wherein the digital rights management control indicates an amount to be credited to the recipient based upon the use of the copy stored at the specific type of memory device.

11. The method of claim 4, wherein the digital rights management control indicates an amount to be credited to the recipient based upon the use of a copy derived from the copy of the file stored at the specific type of memory device.

12. A method for sharing information, including:
receiving at least one criterion that a memory device at a recipient must have to store information to be sent from a sender, the at least one criterion being a type of the memory device;
receiving a digital rights management control associated with the information;
sending a notice to the recipient indicating that the recipient may obtain the information;
receiving a request for the information from the recipient;
sending the file to the recipient to be stored on the memory device, if the second memory device has the one or more criteria.

13. The method of claim 12, wherein the digital rights management control indicates that no copy may be made of the file from the memory device.

14. The method of claim 12, wherein the digital rights management control indicates that no more than a given number of copies may be made of the file from the memory device.

15. The method of claim 12, wherein the digital rights management control indicates that no copy may be made of the file from the memory device if the number of outstanding copies already made of the file from the memory device is equal to a given number.

16. The method of claim 12, wherein the digital rights management control indicates a maximum number of times the copy can be used is equal to a given number.

17. The method of claim 12, wherein the digital rights management control indicates a fee amount to be charged to the recipient based upon the use of the copy stored at the memory device.

18. The method of claim 12, wherein the digital rights management control indicates an amount to be credited to the recipient based upon the use of the copy stored at the memory device.

19. The method of claim 12, wherein the digital rights management control indicates an amount to be credited to the recipient based upon the use of a copy derived from the copy of the file stored at the memory device.

20. An apparatus for sharing information, including:
a processor; and
a memory coupled to said processor, said memory storing instructions adapted to be executed by said processor to perform steps including receiving sending instructions to transfer to a recipient a file, said sending instructions identifying a a specific type of memory device on which the file is permitted to be stored at the recipient, receiving the file, sending a notice to the recipient indicating that the recipient may download the file, receiving a request for the file from the recipient, determining if transfer software to transfer the file only to the specific type of memory device is installed at the recipient, if transfer software is not installed at the recipient, then sending the transfer software to the recipient, and sending the file to the recipient to be stored on the specific type of memory device only if the transfer software to install only to the specific type of memory device is installed.

21. The apparatus of claim 20, wherein the sending instructions identify the specific type of memory device to be a CD-ROM.

22. The apparatus of claim 20, wherein the sending instructions identify the specific type of memory device to be flash memory.

23. The apparatus of claim 20, wherein the sending instructions further identify a digital rights management control to be applied to the file.

24. The apparatus of claim 23, wherein the digital rights management control indicates that no copy may be made of the file from the specific type of memory device.

25. The apparatus of claim 23, wherein the digital rights management control indicates that no more than a given number of copies may be made of the file from the specific type of memory device.

26. The apparatus of claim 23, wherein the digital rights management control indicates that no copy may be made of the file from the specific type of memory device if the number of outstanding copies already made of the file from the specific type of memory device is equal to a given number.

27. The apparatus of claim 23, wherein the digital rights management control indicates a maximum number of times the copy can be used is equal to a given number.

28. The apparatus of claim 23, wherein the digital rights management control indicates a fee amount to be charged to the recipient based upon the use of the copy stored at the specific type of memory device.

29. The apparatus of claim 23, wherein the digital rights management control indicates an amount to be credited to the recipient based upon the use of the copy stored at the specific type of memory device.

30. The apparatus of claim 23, wherein the digital rights management control indicates an amount to be credited to the recipient based upon the use of a copy derived from the copy of the file stored at the specific type of memory device.

31. An apparatus for sharing information, including:
a processor; and a memory coupled to said processor, said memory storing instructions adapted to be executed by said processor to perform steps including receiving at least one criterion that a memory device at a recipient must have to store information to be sent from a sender, the at least one criterion being a type of the memory device, receiving a digital rights management control associated with the information, sending a notice to the recipient indicating that the recipient may obtain the information, receiving a request for the information from the recipient and sending the file to the recipient to be stored on the memory device if the memory device has the one or more criteria.

32. The apparatus of claim 31 wherein the digital rights management control indicates that no copy may be made of the file from the memory device.

33. The apparatus of claim 31, wherein the digital rights management control indicates that no more than a given number of copies may be made of the file from the memory device.

34. The apparatus of claim 31, wherein the digital rights management control indicates that no copy may be made of the file from the memory device if the number of outstanding copies already made of the file from the second memory device is equal to a given number.

35. The apparatus of claim 31, wherein the digital rights management control indicates a maximum number of times the copy can be used is equal to a given number.

36. The apparatus of claim 31, wherein the digital rights management control indicates a fee amount to be charged to the recipient based upon the use of the copy stored at the memory device.

37. The apparatus of claim 31, wherein the digital rights management control indicates an amount to be credited to the recipient based upon the use of the copy stored at the memory device.

38. The apparatus of claim 31, wherein the digital rights management control indicates an amount to be credited to the recipient based upon the use of a copy derived from the copy of the file stored at the memory device.

39. A medium storing instructions adapted to be executed by a processor to perform steps including:
   receiving sending instructions to transfer to a recipient a file, said sending instructions identifying a specific type of memory device on which the file is permitted to be stored at the recipient;
   receiving the file;
   sending a notice to the recipient indicating that the recipient may download the file;
   receiving a request for the file from the recipient;
   determining if transfer software to transfer the file only to the specific type of memory device is installed at the recipient;
   if transfer software is not installed at the recipient, then sending the transfer software to the recipient; and
   sending the file to the recipient to be stored on the second memory device only if the transfer software to install only to the specific type of memory device is installed.

40. The medium of claim 39, wherein the sending instructions identify the specific type of memory device to be a CD-ROM.

41. The medium of claim 39, wherein the sending instructions identify the specific type of memory device to be flash memory.

42. The medium of claim 39, wherein the sending instructions further identify a digital rights management control to be applied to the file.

43. The medium of claim 42, wherein the digital rights management control indicates that no copy may be made of the file from the specific type of memory device.

44. The medium of claim 42, wherein the digital rights management control indicates that no more than a given number of copies may be made of the file from the specific type of memory device.

45. The medium of claim 42, wherein the digital rights management control indicates that no copy may be made of the file from the specific type of memory device if the number of outstanding copies already made of the file from the specific type of memory device is equal to a given number.

46. The medium of claim 42, wherein the digital rights management control indicates a maximum number of times the copy can be used is equal to a given number.

47. The medium of claim 42, wherein the digital rights management control indicates a fee amount to be charged to the recipient based upon the use of the copy stored at the specific type of memory device.

48. The medium of claim 42, wherein the digital rights management control indicates an amount to be credited to the recipient based upon the use of the copy stored at the specific type of memory device.

49. The medium of claim 42, wherein the digital rights management control indicates an amount to be credited to the recipient based upon the use of a copy derived from the copy of the file stored at the specific type of memory device.

50. A medium storing instructions adapted to be executed by a processor to perform steps including:
   receiving at least one criterion that a memory device at a recipient must have to store information to be sent from a sender, the at least one criterion being a type of the memory device;
   receiving a digital rights management control associated with the information;
   sending a notice to the recipient indicating that the recipient may obtain the information;
   receiving a request for the information from the recipient;
   sending the file to the recipient to be stored on the memory device, if the memory device has the one or more criteria.

51. The medium of claim 50, wherein the digital rights management control indicates that no copy may be made of the file from the memory device.

52. The medium of claim 50, wherein the digital rights management control indicates that no more than a given number of copies may be made of the file from the memory device.

53. The medium of claim 50, wherein the digital rights management control indicates that no copy may be made of the file from the memory device if the number of outstanding copies already made of the file from the memory device is equal to a given number.

54. The medium of claim 50, wherein the digital rights management control indicates a maximum number of times the copy can be used is equal to a given number.

55. The medium of claim 50, wherein the digital rights management control indicates a fee amount to be charged to the recipient based upon the use of the copy stored at the memory device.

56. The medium of claim 50, wherein the digital rights management control indicates an amount to be credited to the recipient based upon the use of the copy stored at the memory device.

57. The medium of claim 50, wherein the digital rights management control indicates an amount to be credited to the recipient based upon the use of a copy derived from the copy of the file stored at the memory device.

58. A system for sharing a piece of electronic content, including:
- means for receiving a criterion that a recipient memory device at a recipient must have to store information to be sent from a sender, the at least one criterion being a type of the memory device;
- receiving a digital rights management control that is associated with the content;
- means for notifying a recipient that the content has been made available to the recipient;
- means for receiving a request from the recipient for the content; and
- means for sending the content to the recipient to be stored on the recipient memory device if the recipient memory device has the criterion.

59. The system of claim 58, wherein the digital rights management control indicates that no copy may be made of the file from the second memory device.

60. The system of claim 58, wherein the digital rights management control indicates that no more than a given number of copies may be made of the file from the recipient memory device.

61. The system of claim 58, wherein the digital rights management control indicates that no copy may be made of the file from the recipient memory device if the number of outstanding copies already made of the file from the recipient memory device is equal to a given number.

62. The system of claim 58, wherein the digital rights management control indicates a maximum number of times the copy can be used is equal to a given number.

63. The system of claim 58, wherein the digital rights management control indicates a fee amount to be charged to the recipient based upon the use of the copy stored at the recipient memory device.

64. The system of claim 58, wherein the digital rights management control indicates an amount to be credited to the recipient based upon the use of the copy stored at the recipient memory device.

65. The system of claim 58, wherein the digital rights management control indicates an amount to be credited to the recipient based upon the use of a copy derived from the copy of the file stored at the recipient memory device.

* * * * *